July 18, 1967  F. B. REID, JR  3,331,940
PORTABLE ELECTRIC WINDSHIELD DEFROSTER
Filed May 10, 1965
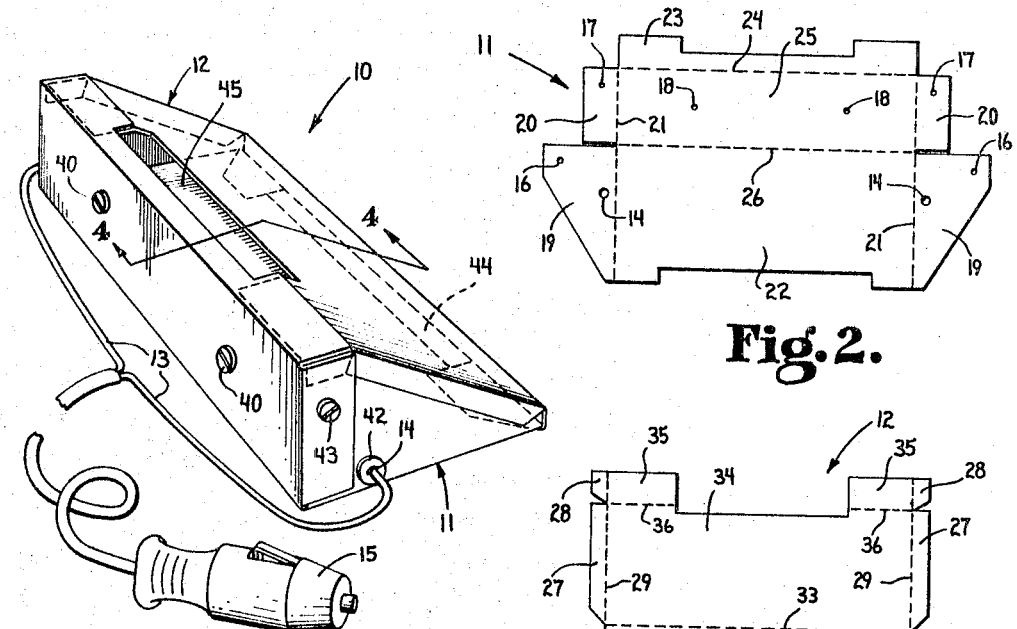
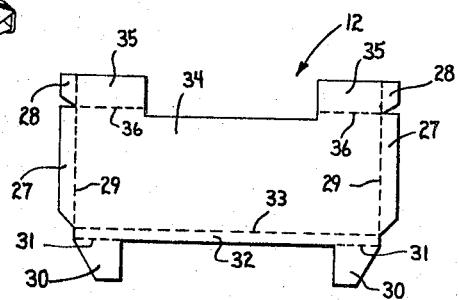
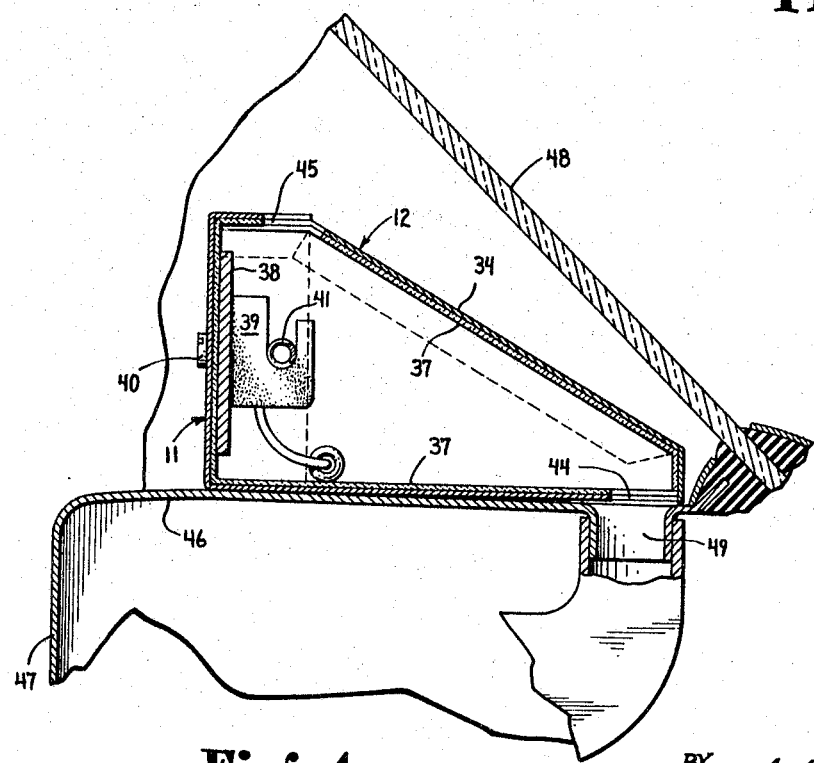
INVENTOR.
FRED B. REID, JR.
BY Hood, Gust & Irish
Attorneys

United States Patent Office 3,331,940
Patented July 18, 1967

3,331,940
PORTABLE ELECTRIC WINDSHIELD DEFROSTER
Fred B. Reid, Jr., 1816 Southeastern Ave.,
Indianapolis, Ind. 46201
Filed May 10, 1965, Ser. No. 454,559
2 Claims. (Cl. 219—203)

ABSTRACT OF THE DISCLOSURE

A portable windshield defroster heater for use with a conventional defroster outlet between the windshield and dashboard of an automobile. A housing having an intake aperture adapted to overlie the conventional defroster outlet and a discharge aperture adapted to direct air emanating therefrom onto the windshield is provided. An electrical heater and a thermal reflector are disposed in the housing so as to heat the air moving from the intake aperture to the discharge aperture without impeding the flow thereof.

---

The present invention relates to improvements in automobile windshield defroster heaters, and more particularly to a portable, electrically operated air heater designed to cooperate with a conventional defroster outlet between the windshield and dashboard of an automobile, and adapted to receive its power from the automobile's electrical system.

A primary object of my invention is to preheat the air issuing from such a defroster outlet for a period of time before the automobile's conventional heater has warmed up sufficiently to remove frost from the windshield. Further objects of my invention are to provide an electrical defroster heater which is inexpensive to manufacture, efficient in operation, and which requires no mechanical attachment to the automobile.

To the accomplishment of the above and related objects, my invention may be embodied in the form illustrated in the accompanying drawings, attention being called to the fact, however, that the drawings are illustrative only, and that changes may be made in the specific construction illustrated and described, so long as the scope of the appended claims is not violated.

FIG. 1 is a perspective view of the preferred form of the electrical heating device and its electrical leads;

FIG. 2 and FIG. 3 depict the blanks which go to make up the housing of the preferred embodiment of the heating device, and include break lines for the necessary folds; and FIG. 4 is a transverse section in situ of the heating device, taken along the line 4—4 of FIG. 1.

Referring more particularly to the drawings, the reference numeral 10 indicates the assembled housing generally of the electrical heating device; 11 and 12 indicate generally the two individual sheet metal pieces which together constitute the elongated, substantially wedge-shaped housing 10. Numeral 13 indicates a pair of electrical leads which pierce the housing at the holes 14, and which terminate in a male plug 15 adapted to fit a conventional automobile cigarette lighter socket, not shown. This plug allows the heating device to be easily connected to the automobile's electrical system without the necessity of any modification of the electrical system.

As is indicated in FIG. 2 and FIG. 3, the housing 10 of the device may be formed from two sheet metal pieces 11 and 12, both of which can be easily and inexpensively blanked by conventional sheet-metal operations. The holes 14, 16, 17 and 18 may be punched simultaneously with the blanking operation by the use of a suitable die set or they may be included afterward by punching or drilling. The tabs 19 and 20 are bent upwardly (from the position shown in FIG. 2) along the break lines 21 to form a right angle with the surface 22. Then the portion 23 is bent upwardly along the line 24 to be perpendicular to the portion 25; portion 25 is also bent upwardly along the line 26 to be perpendicular to the portion 22, at which point the holes 16 will be in registry with the holes 17. Having been blanked as above described, the sheet 12 may be formed in the following manner. The tabs 27 and 28 are bent upwardly (from the position shown in FIG. 3) in a right angle along break lines 29. The tabs 30 are bent upwardly along the line 31 to form a predetermined obtuse included angle with the portion 32, which portion is then itself bent upwardly along the line 33 to be perpendicular to the portion 34. The tabs 35 are bent upwardly along the line 36 to form a predetermined obtuse included angle with the portion 34.

When the pieces 11 and 12 have been formed as described above, a layer of insulating material 37 can be easily bonded to the interior of each sheet. A thermal reflector 38, provided with suitable holes for mounting conventional ceramic insulating supports 39 and holes for registry with the holes 18 of sheet 11, is secured to the sheet 11 by means of fasteners 40, here shown to be self-tapping sheet metal screws. An elongated helical electrical heating element 41 is mounted on the insulating supports 39 and is connected to the leads 13. The holes 14 through which the leads pass are preferably provided with rubber grommets 42 to prevent chafing. The pieces 11 and 12 are assembled as shown in FIG. 1 and fasteners 43 are inserted through the holes 16 and 17. When the two pieces are assembled in this manner, a slot 44 appears in the lower surface, and a slot 45 in an upper surface, of the completed housing 10, without the necessity of punching any interior slots in either of the pieces 11 and 12. It will be appreciated from this detailed description that the device may be fabricated easily and inexpensively even for short production runs, since only simple sheet-metal operations are involved.

FIG. 4 illustrates the device in place on a horizontal shelf 46 between the dashbord 47 and sloping windshield 48 of an automobile. When the device is in this position, the inlet aperture 44 of the device overlies a conventionally placed defroster outlet 49 of the automobile. Thus, air forced from the defroster outlet passes through the inlet aperture 44. The air is then deflected by the sloping surface 34 of the housing so that it will flow past the heating element 41 and thence out of the device through the discharge aperture 45. The reflector element 38 adds to the efficiency of the device by directing heat which would otherwise be lost into the path of air moving through the device. The insulating layer 37 further adds to the efficiency, and prevents the housing 10 from becoming excessively hot while the device is in operation. The particular configuration of the housing described has three major advantages. First, the sloping surface 34 allows the device to be placed so that it will obscure only an insignificant area of the windshield 48, and yet direct the warmed air from the discharge aperture 45 toward that area of the windshield most needed for proper driving vision. Second, the location of the heating element and reflector allow the moving air to be effectively heated during its entire passage through the device, enabling the transfer of more heat to it for a given size of heating element than would be possible if the air were heated only in a small area in the immediate vicinity of the heating element. Third, the positioning of the heating elements and its supports out of the most direct path of air allows a large volume of air to flow through the device with little impedance; and the sloping surface 34 enables warmer air to rise toward the discharge aperture 45 of its own accord, without impeding the flow of the cooler air below it. Since the air emanating from the defroster outlet 49 is under a relatively low pressure, these reductions in impedance to air flow aid in reducing leakage around the inlet aperture 44, and obviate the necessity of any type of seal between the defroster outlet 49 and the inlet aperture 44.

As will be appreciated from this description of its fabrication and operation, the present heating device will provide defrosting action almost immediately after it is placed in position and plugged in. Unlike previous devices of its kind, it requires no mechanical installation in the automobile and no modification of the automobile's electrical wiring. The present heating device is completely portable and is adapted to be used in a wide range of automobiles. Furthermore, it is inexpensive to manufacture and simple to use.

I claim as my invention:

1. A portable windshield defroster heater for use with a conventional defroster outlet between the windshield and dashboard of an automobile, comprising in combination
   an elongated substantially wedge-shaped housing having a flat lower surface, and at least one upper surface,
   said lower surface being provided with at least one intake aperture adapted to overlie such a defroster outlet,
   said upper surface being provided with at least one discharge aperture positioned to direct air emanating therefrom onto the windshield of said automobile,
   a layer of thermal insulating material secured to the interior surfaces of said housing,
   an elongated electrical heating element mounted inside said housing and adjacent to the path of air flowing from said intake aperture to said discharge aperture,
   a thermal reflector mounted inside said housing so as to radiantly reflect thermal energy into said path, said reflector being located completely out of said path and a pair of electrical leads from said electrical heating element, said leads terminating in a male plug adapted to fit a conventional automobile cigarette lighter socket.

2. As an article of manufacture, a portable windshield defroster heater unit designed to cooperate with a conventional windshield defroster outlet between the windshield and dashboard of an automobile, said heater unit comprising a substantially wedge-shaped housing adapted to fit into the wedge-shaped space defined by the windshield and dashboard of said automobile, said housing comprising a substantially flat bottom wall adapted to rest on the dashboard, a flat, vertical back wall and a sloping, substantially flat, front wall which is substantially parallel with a line running from the forwardmost portion of said bottom wall and the uppermost portion of said back wall, said bottom wall being provided, at its forwardmost portion, with an intake aperture, said intake aperture overlying the defroster outlet, said front wall being provided, at its uppermost portion, with a discharge aperture, said discharge aperture being positioned so as to direct air emanating therefrom onto the windshield, a layer of thermal insulating material secured to the interior surfaces of said housing, an elongated, horizontally disposed, electrical heating element supported from the inside surface of said back wall, and a thermal reflector mounted between said heater and said back wall so as radiantly to reflect thermal energy into the path of air moving from said intake aperture to said discharge aperture.

References Cited
UNITED STATES PATENTS

| | | | |
|---|---|---|---|
| 1,517,833 | 12/1924 | Gertler et al. | 219—375 X |
| 1,994,284 | 3/1935 | Martinek | 219—266 X |
| 2,546,355 | 3/1951 | Bloomer | 219—203 |
| 2,839,659 | 6/1958 | Cotts et al. | 219—365 X |
| 3,026,401 | 3/1962 | Cheviron | 219—203 |
| 3,221,138 | 11/1965 | Hercher | 219—366 |

FOREIGN PATENTS

| | | |
|---|---|---|
| 643,954 | 9/1950 | Great Britain. |

ANTHONY BARTIS, *Primary Examiner.*